United States Patent [19]

Lim et al.

[11] 4,265,124

[45] May 5, 1981

[54] REMOTE ACOUSTIC WAVE SENSORS

[75] Inventors: Teong C. Lim; Edward J. Staples, both of Thousand Oaks, Calif.

[73] Assignee: Rockwell International Corporation, El Segundo, Calif.

[21] Appl. No.: 45,506

[22] Filed: Jun. 4, 1979

[51] Int. Cl.³ .............................................. G01L 9/00
[52] U.S. Cl. ....................................... 73/703; 73/300; 331/65
[58] Field of Search ................. 73/703, 299, 300, 702, 73/704, 723, 717, DIG. 4; 331/65, 310/313 R

[56] References Cited

U.S. PATENT DOCUMENTS

| | | | |
|---|---|---|---|
| 3,717,857 | 2/1973 | Evans | 128/782 |
| 3,978,731 | 9/1976 | Reeder et al. | 73/703 |

*Primary Examiner*—Donald O. Woodiel
*Attorney, Agent, or Firm*—H. Fredrick Hamann; Craig O. Malin; John J. Deinken

[57] ABSTRACT

Disclosed is an acoustic wave sensor, including an acoustic wave oscillator having a resonant frequency which is modulated according to changes in a physical variable and a broadcast amplifier for directly transmitting the modulated frequency as a radio frequency signal. As a surface acoustic wave pressure sensor, the sensor includes a housing defining a cavity therein, an opening in the housing communicating with the cavity, a surface acoustic wave transducer attached to the housing to close the opening and adapted to deflect in response to a pressure differential across the transducer, an amplifier coupled to the transducer in a feedback loop, the transducer thereby being adapted to modulate the resonant frequency of the loop in response to the deflection, and a broadcast amplifier for directly transmitting the modulated frequency as a radio frequency signal. As a Stoneley acoustic wave pressure sensor, the sensor includes a housing defining a cavity therein, an opening in the housing communicating with the cavity, a Stoneley acoustic wave transducer attached to the housing to close the opening and adapted to deflect in response to a dynamic pressure differential across the transducer, an orifice in the housing communicating with the cavity to equalize any static pressure differential, an amplifier coupled to the transducer in a feedback loop, the transducer thereby being adapted to modulate the resonance frequency of the loop in response to the deflection, and a broadcast amplifier for directly transmitting the modulated frequency as a radio frequency signal.

10 Claims, 5 Drawing Figures

U.S. Patent   May 5, 1981   Sheet 1 of 2   4,265,124
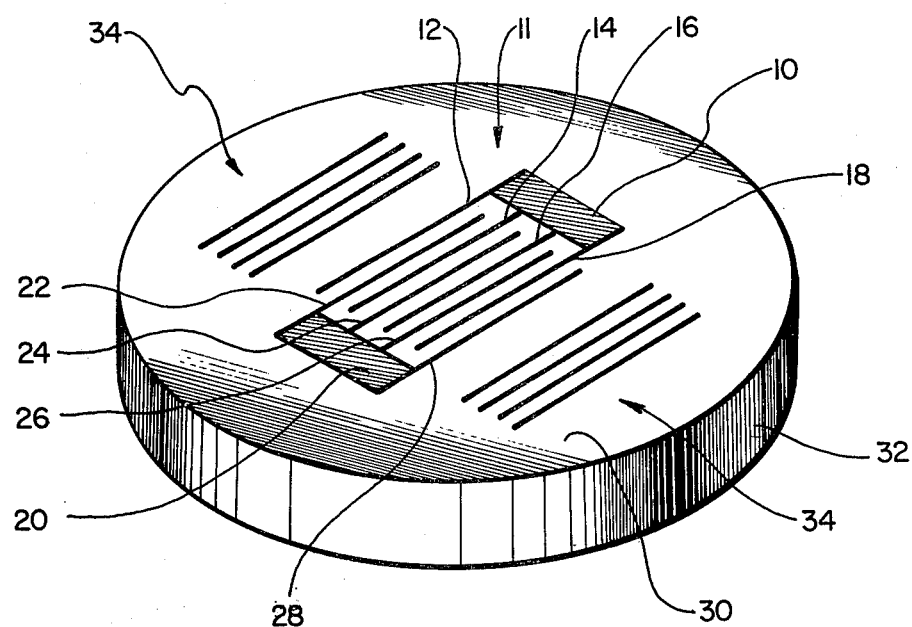
FIG.I.
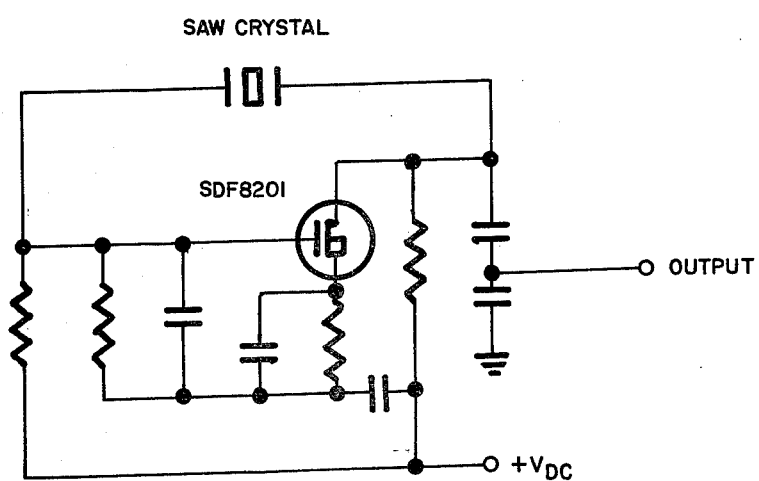
FIG.2.

REMOTE ACOUSTIC WAVE SENSORS

BACKGROUND OF THE INVENTION

This invention relates to apparatus and methods for the measurement of physical variables. More particularly, the invention concerns the measurement of such variables at a remote location.

Physical variables, such as pressure, temperature, atmospheric loading, etc., are required to be measured in many different applications in research and industrial procedures. Frequently, such variables must be measured at a remote location and information concerning the measured quantity must then be relayed to a receiving unit. In underwater communications systems utilizing sonar, for example, remote pressure sensors are employed to detect dynamic water pressure changes which contain information useful in communications or detection systems. Such sonar pressure sensors are commonly employed on sonobuoys and in towed sensor arrays.

In the past, sensors for use in sonar and other such remote applications have employed transducers which utilize the principles of magnetostriction or piezoelectricity to convert water pressure or other changes caused by a signal to changes in the amplitude of an electrical signal. When the information detected by a remote pressure sensor must be relayed to another location, such an amplitude modulated signal has commonly been converted in the prior art to a frequency modulated signal and then transmitted in a radio frequency broadcast to a receiver.

Such prior art methods of detecting and relaying information concerning pressure and other physical variables are subject to a number of disadvantages. Amplitude modulated sensors operate effectively only for relatively low frequency inputs. In addition, the output signal provided by such a sensor is at a very low level. As a consequence, the signals provided by known remote transducer designs tend to contain an excessive amount of electrical noise. Furthermore, relatively complex electronic circuitry is required in the design of such a transducer to provide the AM to FM conversion capability, with the result that prior art sensing systems have tended to be expensive, unreliable, and relatively short lived. In addition, prior art remote sensor designs have been subject to variations in output depending upon variations in the ambient temperature at the location of the sensor.

Consequently, a need has developed in the art for an improved sensing technique capable of sensing a physical variable at a remote location and relaying information concerning the variable. It would be advantageous for such a system to be highly reliable yet relatively inexpensive to construct. Furthermore, it would be desirable for such a system to provide a clear and distinct output signal with sufficient signal strength to be effectively transmitted to a distant receiver.

SUMMARY OF THE INVENTION

It is a general object of this invention to provide a new and improved technique for the measurement of a physical variable at a remote location.

An acoustic wave sensor, according to this invention, includes an acoustic wave oscillator having a resonant frequency which is modulated according to changes in a physical variable, and a broadcast amplifier for directly transmitting the modulated frequency as a radio frequency signal.

The oscillator includes a Stoneley acoustic wave transducer and an amplifier coupled to the transducer in a feedback loop, the transducer thereby being adapted to modulate the resonant frequency of the loop.

In a preferred embodiment, the sensor is a Stoneley acoustic wave pressure sensor, which includes a housing defining a cavity therein, an opening in the housing communicating with the cavity, a Stoneley acoustic wave transducer attached to the housing to close the opening and adapted to deflect in response to a dynamic pressure differential across the transducer, an orifice in the housing communicating with the cavity to equalize any static pressure differential, an amplifier coupled to the transducer in a feedback loop, the transducer thereby being adapted to modulate the resonant frequency of the loop in response to the deflection, and a broadcast amplifier for directly transmitting the modulated frequency as a radio frequency signal.

The Stoneley acoustic wave transducer may include a first piezoelectric crystal having a first smooth surface, a second piezoelectric crystal having a second smooth surface contacting the first surface to define an interface between the crystals, and an interdigital conductor array disposed upon the first surface and adapted to generate a Stoneley acoustic wave in the interface upon the application of a radio frequency signal to the array.

A method of measuring a physical variable at a remote location, according to the present invention, includes the steps of:
(a) generating a Stoneley acoustic wave in a piezoelectric material at a known frequency,
(b) modulating the frequency of the generated wave in accordance with a change in the physical variable, and
(c) broadcasting the modulated frequency as a radio frequency signal.

In a preferred embodiment utilizing a Stoneley acoustic wave transducer to measure pressure, the method of the invention includes the steps of:
(a) coupling a Stoneley acoustic wave transducer in a feedback loop,
(b) mounting the transducer so that it is deflected in response to a pressure differential, thereby modulating the resonant frequency of the feedback loop, and
(c) broadcasting the modulated frequency as a radio frequency signal.

Examples of the more important features of the invention have been broadly outlined above in order to facilitate an understanding of the detailed description that follows and so that the contributions which this invention provides to the art may be better appreciated. There are, of course, additional features of the invention, which will be described below and which are included within the subject matter of the appended claims.

BRIEF DESCRIPTION OF THE DRAWINGS

Additional objects, features, and advantages of the present invention will become apparent by referring to the detailed description below of the preferred embodiments in connection with the accompanying drawings, wherein like reference numerals refer to like elements throughout all the figures. In the drawings:

FIG. 1 is a perspective view illustrating a typical surface acoustic wave transducer.

FIG. 2 is an electrical circuit schematic for an acoustic wave oscillator circuit which may be utilized with a surface acoustic wave transducer.

DESCRIPTION OF THE PREFERRED EMBODIMENT

Figure 3:
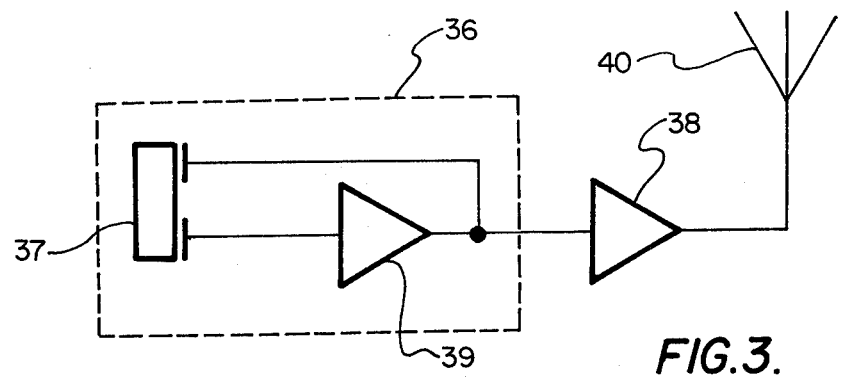
FIG. 3 is a block diagram illustrating an acoustic wave sensor constructed according to the present invention.

The present invention utilizes an acoustic wave device to detect a physical variable. In describing the invention, it will be convenient to first refer to a particular type of acoustic wave, namely, a surface acoustic wave (known as a SAW wave). A surface acoustic wave can be made to propagate on a smooth surface of a crystalline solid. The energy content of a surface acoustic wave decays exponentially with depth into the propagating material and thus most of the wave energy is concentrated within one wave length of the surface. The surface acoustic wave, therefore, will propagate substantially independently of any conditions affecting the opposite surface of the host solid.

Now referring to FIG. 1, a perspective view is provided of a typical surface acoustic wave transducer. A surface acoustic wave may be generated by an interdigital conductor array 11 of electrodes deposited on a crystalline surface at half wavelength spacings. The transmitting electrode 10 of the array includes multiple transmitting fingers 12, 14, 16, and 18. Similarly, a receiving electrode 20 includes receiving fingers 22, 24, 26, and 28. The electrodes are deposited on a smooth surface 30 of a suitable crystalline material 32, which typically is quartz or lithium niobate. The fingers are spaced apart by a half wavelength, the wavelength being selected so that the wave generated has a preselected frequency, taking into consideration the velocity at which a surface acoustic wave will propagate in the particular crystalline material 32 which is utilized. The amplitude and bandwidth of the generated wave are determined by the number of finger pairs employed in the array, the bandwidth being inversely proportional to the number of fingers. When the device is connected to an alternating current source having the appropriate preselected frequency, its behavior is electrically equivalent to a series RLC circuit in parallel with a capacitance.

A surface acoustic wave transducer, however, exhibits other characteristics which make it significantly more useful than its equivalent electronic circuit in certain applications. Because of these features, the surface acoustic wave transducer is especially advantageous for employment as the feedback element in a crystal controlled oscillator. In this configuration, the surface acoustic wave device exhibits a much higher Q than the equivalent circuitry, on the order of 100 times the electrical circuit equivalent. Furthermore, the narrow bandwidth characteristic of the surface acoustic wave device permits a more precise frequency of resonance to be selected. For use in this application, an amplifier is connected to the interdigital conductor array and a surface acoustic wave is generated by the transmitting electrode, propagates on the crystalline surface to the receiver electrode, is detected, and then is supplied as an input to the amplifier. The amplifier output is fed back to the transmitting electrode. Such as oscillator is designed so that the phase slope of the surface acoustic wave transducer is much greater than that of the other oscillator components, the transducer phase shift thereby controlling the stability of the oscillator.

When the surface acoustic wave device is used in an oscillator in the above described manner, it is also advantageous to add reflecting barriers to reinforce the signal. As shown in FIG. 1, reflecting barriers 34 are deposited on the surface of the crystalline material 32 spaced at multiples of the desired wave length from the transmitting and receiving fingers. The barriers will reflect the propagated wave back into the array 11 for coherent amplification of the SAW in a manner similar to laser action.

FIG. 2 is a schematic illustration showing a typical circuit configuration for an oscillator employing a surface acoustic wave transducer. The circuitry shown in FIG. 2 is configured as a Pierce oscillator which is useful in this application because of its simplicity, due to a minimal number of components, and because it is relatively frequency stable.

One particular application for the surface acoustic wave oscillator configuration is as a sensor. Any stress which is introduced into the crystalline material 32 of the surface acoustic wave transducer will cause a change in the distance between the transmitting and receiving fingers of the array and will also change the velocity of wave propagation in the crystalline material, thereby effecting a change in the resonant frequency of the oscillator which change will be proportional to the applied stress. Thus, any physical change which affects the crystal can be measured by the resulting change in resonant frequency of the attached oscillator circuitry. Because of this frequency modulation effect, a surface acoustic wave sensor can be utilized to measure physical quantities such as temperature, pressure, atmospheric loading, particle counting, etc.

An acoustic wave sensor may be utilized for the sensing of a physical variable at a remote location and for the transmission of information regarding the physical variable to a distant receiver. Now referring to FIG. 3, a schematic block diagram is provided illustrating a remote acoustic wave sensor. In FIG. 3, an acoustic wave oscillator 36, including an acoustic wave transducer 37 and a feedback amplifier 39, exhibits a characteristic resonant frequency which is modulated according to changes in a physical variable. A broadcast amplifier 38 receives the modulated frequency signal from the acoustic wave oscillator 36 and amplifies the signal for transmission as a radio frequency signal. A transmitting antenna 40 receives the output of the broadcast amplifier to efficiently radiate the signal information to a distant receiving unit. As discussed above, an acoustic wave sensor converts changes in a physical variable, such as pressure, to changes in a resonant frequency. Since an acoustic wave oscillator may be selected to have a resonant frequency in the radio frequency range, the frequency-modulated signal from an acoustic wave sensor can be directly amplified and broadcasted. Because of this feature, an acoustic wave sensor offers significant advantages when used as a remote sensor, including a stronger, more noise free signal and simplified electrical circuitry, resulting in a longer life, higher reliability, and more economical costs of construction.

Figure 4:
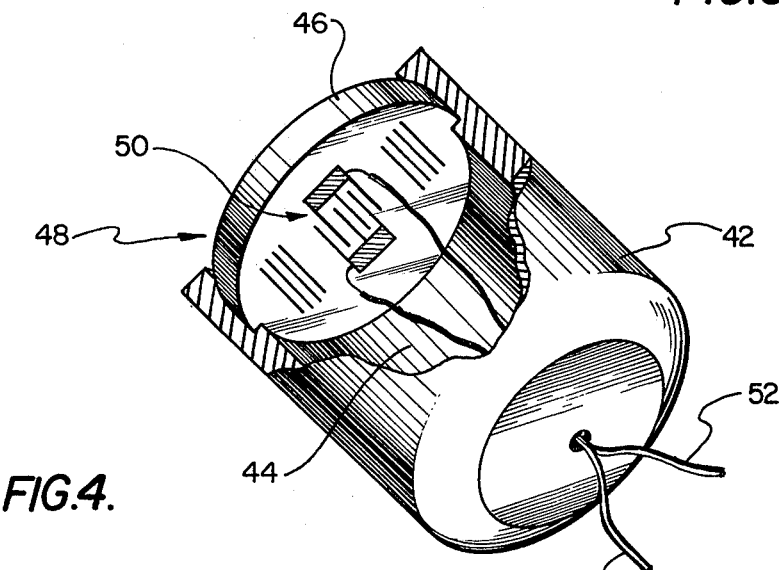
FIG. 4 is a cross sectional side view of a surface acoustic wave pressure transducer.

An acoustic wave sensor may be utilized to detect underwater pressure changes. Illustrated in FIG. 4 is a cross sectional side view of a surface acoustic wave pressure transducer designed for use underwater. The pressure sensor includes a housing 42 which defines a cavity 44 therein. A surface acoustic wave transducer 46, similar to the surface acoustic wave transducer illustrated in FIG. 1, is attached to the housing to seal the cavity 44. In this manner, pressure changes imposed on the outer surface 48 of the transducer 46 will cause a relative pressure differential across the transducer and a resulting deflection of the transducer. The resulting stress will be detected by the transmitting and receiving electrodes deposited on the inner surface 50 of the transducer when the electrode leads 52 and 54 are connected in an oscillator circuit as illustrated in FIG. 3.

Figure 5:
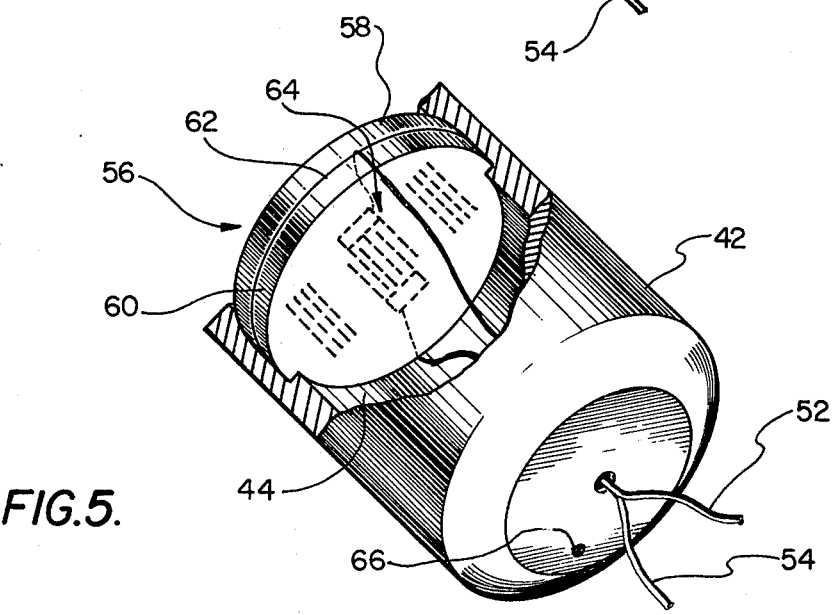
FIG. 5 is a cross sectional side view of a Stoneley acoustic wave pressure transducer.

Now referring to FIG. 5, the preferred embodiment of the invention is illustrated in a cross sectional side view of a Stoneley wave pressure transducer. The transducer of FIG. 5 is similar to that of FIG. 4, and also includes a housing 42 defining a cavity 44 therein. The transducer of FIG. 5, however, is provided with a Stoneley wave transducer 56 which seals the cavity 44 and flexes in response to pressure differentials between the cavity and the environment external to the transducer. A Stoneley acoustic wave is similar to a surface acoustic wave but propagates at an interface between two crystalline materials, rather than on the surface of a crystalline material. The Stoneley wave transducer 56 is constructed of a first piezoelectric crystal 58 and a second piezoelectric crystal 60, which are maintained in mating contact to define an interface 62 between the crystals. Deposited on the surface of one of the crystals and positioned within the interface 62 is an interdigital conductor array 64, which is substantially similar in structure to that of the surface acoustic wave transducer illustrated in FIG. 4. As in FIG. 4, the electrode leads 52 and 54 are attached to the interdigital conductor array 64 and may be connected to an oscillator circuit as illustrated in FIG. 3.

The use of the Stoneley wave device in a pressure sensor offers some significant advantages. Since the relatively fragile interdigital conductor array can be completely isolated by being placed between two crystalline materials, the Stoneley wave device is better able to withstand the effects of a harsh environment which might otherwise damage the conductor array. This feature is particularly advantageous in a corrosive environment such as salt water. In addition, a Stoneley wave device may be provided with an automatic adjustment feature to compensate for different ambient pressures, unlike the transducer illustrated in FIG. 4. The transducer of FIG. 4 must be sealed with the cavity 44 at a certain pressure, which limits the flexibility of that sensor. If the FIG. 4 transducer were lowered to sufficient depths underwater, for example, the large increase in ambient water pressure around the sensor would impose a static deflection on the surface acoustic wave crystal 46, rendering it less responsive to pressure differentials. At even greater depths and higher pressures, the ambient pressure would eventually force the crystal inward until it yielded.

The Stoneley wave transducer of FIG. 5 includes a small orifice 66 passing through the side of the housing 42, so that the cavity 44 communicates with the pressure environment external to the transducer. The orifice 66 thus permits the pressure within the cavity 44 to equalize with the pressure outside of the transducer. The orifice, however, is sufficiently small in cross section that dynamic pressure changes over a relatively short time period, such as might be introduced by a sonar signal, still cause the transducer to deflect and generate a signal output from an attached oscillator. Because of this feature, the transducer of FIG. 5 may be used at any water depth and need not be confined to a particular depth within a restricted ambient pressure range.

In conclusion, although typical embodiments of the present invention have been illustrated and discussed above, numerous modifications and alternative embodiments of the apparatus and method of this invention will be apparent to those skilled in the art in view of this description. Although the invention has been described with respect to pressure sensors, for example, those skilled in the art will recognize that the principles of the invention are equally applicable to many other applications requiring the measurement of a physical variable at a remote location. Accordingly, this description is to be considered as illustrative only and is provided for the purpose of teaching those skilled in the art the manner of constructing the apparatus and performing the method of this invention. Furthermore, it should be understood that the forms of the invention depicted and described herein are to be considered as the presently preferred embodiments. Various changes may be made in the configurations, sizes, and arrangements of the components of the invention, as will be recognized by those skilled in the art, without departing from the scope of the invention. Equivalent elements, for example, might be substituted for those illustrated and described herein, parts or connections might be reversed or otherwise interchanged, and certain features of the invention might be utilized independently of the use of other features, all as will be apparent to one skilled in the art after receiving the benefit obtained through reading the above description of the invention.

What is claimed is:

1. An acoustic wave sensor, comprising:
   an acoustic wave oscillator having a resonant frequency which is modulated according to changes in a physical variable, including a Stoneley acoustic wave transducer and an amplifier coupled to said transducer in a feedback loop, the transducer thereby being adapted to modulate the resonant frequency of said loop; and a broadcast amplifier for directly transmitting said modulated frequency as a radio frequency signal.

2. The sensor of claim 1, further comprising a transmitting antenna for receiving the output of said broadcast amplifier and radiating said radio frequency signal.

3. The sensor of claim 1, wherein said transducer further comprises:
   a first piezoelectric crystal having a first smooth surface;
   a second piezoelectric crystal having a second smooth surface contacting said first surface to define an interface between said crystal; and
   an interdigital conductor array disposed upon said first surface and adapted to generate a Stoneley acoustic wave in said interface upon the application of a radio frequency signal to said array.

4. The sensor of claim 3, wherein said sensor is adapted to detect pressure and further comprises:
   a housing defining a cavity therein; and
   an opening in said housing communicating with said cavity, said crystals being attached to said housing to close said opening and being adapted to deflect in response to a pressure differential across said crystals.

5. The sensor of claim 4, further comprising an orifice in said housing communicating with said cavity, said orifice providing static pressure equalization, yet being sufficiently small that said crystals will deflect in response to a dynamic pressure differential.

6. The sensor of claim 5, wherein said sensor is adapted to operate in an underwater environment.

7. A Stoneley acoustic wave pressure sensor, comprising:
a housing, defining a cavity therein;
an opening in said housing communicating with said cavity;
a Stoneley acoustic wave transducer attached to said housing to close said opening and adapted to deflect in response to a dynamic pressure differential across said transducer;
an orifice in said housing communicating with said cavity to equalize any static pressure differential;
an amplifier coupled to said transducer in a feedback loop, the transducer thereby being adapted to modulate the resonant frequency of the loop in response to said deflection; and
a broadcast amplifier for directly transmitting said modulated frequency as a radio frequency signal.

8. A method of measuring a physical variable at a remote location, comprising the steps of:
generating a Stoneley acoustic wave in a piezoelectric material at a known frequency;
modulating the frequency of the generated wave in accordance with a change in the physical variable; and
directly broadcasting the modulated frequency as a radio frequency signal.

9. The method of claim 8, wherein the measured physical variable is pressure.

10. A method of measuring pressure at a remote location, comprising the steps of:
coupling a Stoneley acoustic wave transducer in a feedback loop;
mounting the transduceer so that it is deflected in response to a pressure differential, thereby modulating the resonant frequency of the feedback loop; and
broadcasting the modulated frequency as a radio frequency signal.

* * * * *